Patented May 29, 1945

2,377,193

UNITED STATES PATENT OFFICE 2,377,193

PROCESS FOR THE PRODUCTION OF HYDROXYLAMMONIUM CHLORIDE

Philip F. Tryon, Terre Haute, Ind., assignor to Commercial Solvents Corporation, Terre Haute, Ind., a corporation of Maryland No Drawing. Application October 9, 1943, Serial No. 505,664

10 Claims. (Cl. 23—87)

My invention relates to a process for the production of hydroxylammonium chloride. More particularly, it relates to a process for the production of hydroxylammonium chloride by the reaction of hydroxylammonium sulfate with hydrochloric acid.

Prior methods of preparing hydroxylammonium chloride have generally been unsatisfactory in view of the relatively long and involved procedures utilized, and the comparatively low yields obtained thereby. Typical of the former methods employed in the synthesis of hydroxylammonium chloride, is the procedure involving the use of sodium nitrite, sodium bisulfite and sulfur dioxide to produce sodium hydroxylamine disulfonate, which is in turn treated with acetone to form acetoxime. On hydrolysis of the latter with hydrochloric acid, hydroxylammonium chloride is produced.

I have now discovered that hydroxylammonium chloride can be prepared in yields of 85 per cent and above merely by treating hydroxylammonium sulfate with hydrochloric acid in aqueous, or aqueous alcoholic solutions. To obtain hydroxylammonium chloride from hydroxylammonium sulfate under such conditions, is entirely contrary to that which one skilled in the art would normally expect, since it is known that the solubility of hydroxylammonium chloride in water is greater than that of hydroxylammonium sulfate. For example, at 25° C. hydroxylammonium chloride is soluble in water to the extent of 95 grams per 100 grams of water, while hydroxylammonium sulfate is soluble in water to the extent of only 64 grams per 100 grams of water. Notwithstanding this fact, however, an aqueous reaction mixture containing one equivalent each of hydroxylamine, sulfuric acid, and hydrochloric acid has been found to yield 60 per cent of the hydroxylamine as crystalline hydroxylammonium chloride and only 3 per cent of the hydroxylamine as the sulfate.

The reaction is usually effected at atmospheric pressure, and preferably in the presence of a suitable solvent, such as a lower alcohol, at a temperature of 0° C. to 85° C., and preferably from 20° C. to 70° C. The precipitation of the hydroxylammonium chloride is facilitated by cooling the reaction solution, after which the solid hydroxylammonium chloride may be removed from the reaction solution by any suitable means, preferably by filtration. The product obtained in this manner is relatively pure; however, it is advantageous to wash it with an equivalent proportion of a lower alcohol, which may be saved and used as the source of solvent for another reaction solution. The crystals obtained from this process are preferably dried for approximately two hours at 70–80° C.

The reaction is effected with satisfactory results without the presence of a lower alcohol solvent. However, slightly better yields are obtained and the separation of the reaction product is more easily accomplished when utilizing a lower alcohol solvent, such as methanol. Also, it is sometimes advantageous to heat the reaction mixture to an elevated temperature of approximately 70° C. In such instances, however, little if any advantage is obtained by keeping the lower alcohol reaction mixture at an elevated temperature for an extended length of time.

There are several factors to be considered in selecting the lower alcohol solvent. Methanol, ethanol, propanol, butanol, etc., are all satisfactory as solvents, but methanol, being more readily available, was used for the most part throughout the experiments. Furthermore, it was found that the reaction product was more easily separated from a methanol reaction solution than from the other alcohol solutions. The amount of alcohol used in the reaction mixture and in the wash respectively should be of the order of one, to one and one-half equivalents for each equivalent of hydroxylammonium sulfate. When the number of equivalents of alcohol is increased, there is a decrease in the yield of hydroxylammonium chloride, probably due to the fact that greater amounts of hydroxylammonium chloride are dissolved in the increased amount of alcohol and not completely recovered therefrom.

The ratio of equivalents of hydrochloric acid to the hydroxylammonium sulfate has a decided effect upon the yield of hydroxylammonium chloride. In instances where one equivalent, or slightly less of hydrochloric acid is utilized, the product obtained is not entirely hydroxylammonium chloride, but some of the sulfate is also precipitated along with the chloride. In order to secure satisfactory yields there should be in the reaction mixture an excess of the hydrochloric acid and preferably there should be from one and one-fourth to two equivalents of hydrochloric acid for each equivalent of the hydroxylammonium sulfate. For example, a reaction mixture consisting of one equivalent of hydroxylammonium sulfate, one and one-half equivalents of 38 per cent hydrochloric acid, and one equivalent of methanol yields about 80 per cent of the theoretical amount of the hydroxylammonium chloride in a state of approximately 99 per cent purity.

The degree of purity of the reactants is an important factor in the reaction. Better yields are obtained from relatively pure hydroxylammonium sulfate than from the impure material, even though equivalent quantities are used; there is noted a corresponding decrease in yield with each decrease in per cent of purity of the hydroxylammonium sulfate. The same is true of the concentration of hydrochloric acid. For example, lower yields were obtained using 33 per cent hydrochloric acid than were secured when using 38 percent hydrochloric acid.

My invention may be further illustrated by the following specific examples:

EXAMPLE I

Hydroxylammonium chloride was prepared by heating a mixture consisting of 167 parts of 98 per cent hydroxylammonium sulfate, 384 parts of 38 per cent hydrochloric acid and 75 parts of isopropyl alcohol in a suitable reaction vessel to a temperature of approximately 70° C. When the reaction appeared to be complete, the mixture was cooled in ice water to a temperature of approximately 18° C. The crystalline hydroxylammonium chloride thus formed was filtered, washed with 60 parts of isopropyl alcohol, and dried at approximately 70° C. for 2 hours. The product thus obtained corresponded to a yield of 75 per cent.

EXAMPLE II

One hundred and sixty-seven parts of 98 per cent hydroxylammonium sulfate and 384 parts of 38 per cent hydrochloric acid was heated in a suitable vessel to a temperature of 70° C., with constant agitation, at which time there was added to the mixture 80 parts of ethanol. The reaction mixture was then cooled as in Example I, and the crystalline product separated from the reaction mixture, yielding a material corresponding to a yield of 73 per cent.

EXAMPLE III

A mixture consisting of 150 parts of water, 32 parts of methanol, and 84 parts of 98 per cent hydroxylammonium sulfate, was treated to saturation at 18° C. with hydrogen chloride. The crude hydroxylammonium chloride, obtained in this manner, was filtered, washed with 32 parts of methanol, and dried at 70° C. for two hours. The crystalline product obtained in this manner weighed 59.5 grams, corresponding to a yield of 85 per cent.

EXAMPLE IV

A mixture consisting of 163 parts of 98 per cent hydroxylammonium sulfate, 384 parts of 38 per cent hydrochloric acid, and 64 parts of methanol which had been used as the wash methanol in Example III, was heated to a temperature of 70° C., after which the heat was cut off and the reaction mixture cooled in ice water to a temperature of 18° C. The crystalline product obtained in this manner was filtered, washed with methanol, and dried at a temperature of 70° C. for two hours. The hydroxylammonium chloride, obtained in this manner, corresponded to a yield of 81 per cent.

The following table illustrates in tabular form the results obtained when hydroxylammonium sulfate, 38 per cent hydrochloric acid and methanol were heated to a temperature of 70° C., cooled to 18° C., and filtered.

TABLE I

*Equivalent proportions*

| Run | HS[1] (98%) | HCl (38%) | MeOH in reaction | MeOH in wash | Per cent yield [2] |
|---|---|---|---|---|---|
| 1-A | 1.0 | 2.0 | 1.0 (fresh) | 1.0 (fresh) | 75 |
| 1-B | 1.0 | 2.0 | 1.0 (wash A) | 1.0 (fresh) | 81 |
| 1-C | 1.0 | 2.0 | 1.0 (wash B) | 1.0 (fresh) | 81 |
| 2-A | 1.0 | 1.5 | 1.0 (fresh) | 1.0 (fresh) | 68 |
| 2-B | 1.0 | 1.5 | 1.0 (wash A) | 1.0 (fresh) | 77 |
| 2-C | 1.0 | 1.5 | 1.0 (wash B) | 1.0 (fresh) | 77 |
| 3-A | 1.0 | 1.25 | 1.0 (fresh) | 1.0 (fresh) | 63 |
| 3-B | 1.0 | 1.25 | 1.0 (wash A) | 1.0 (fresh) | 74 |
| 3-C | 1.0 | 1.25 | 1.0 (wash B) | 1.0 (fresh) | 73 |
| 4-A | 1.0 | 1.0 | 1.0 (fresh) | 1.0 (fresh) | 56 |
| 4-B | 1.0 | 1.0 | 1.0 (wash A) | 1.0 (fresh) | 61 |
| 4-C | 1.0 | 1.0 | 1.0 (wash B) | 1.0 (fresh) | 65 |
| 5-A | 1.0 | 0.9 | 1.0 (fresh) | 1.0 (fresh) | 48 |
| 5-B | 1.0 | 0.9 | 1.0 (wash A) | 1.0 (fresh) | 56 |
| 5-C | 1.0 | 0.9 | 1.0 (wash B) | 1.0 (fresh) | 56 |
| 6-A | 1.0 | 0.8 | 1.0 (fresh) | 1.0 (fresh) | 45 |
| 6-B | 1.0 | 0.8 | 1.0 (wash A) | 1.0 (fresh) | 51 |
| 6-C | 1.0 | 0.8 | 1.0 (wash B) | 1.0 (fresh) | 49 |

[1] Hydroxylamine sulfate.
[2] Hydroxylammonium chloride.

The following table of results obtained when the reaction mixture was heated to 70° C., cooled to 18° C., and filtered, illustrate the fact that the concentration of acid has a definite effect on the yields obtained:

TABLE II

*Equivalent proportions*

| HS[1] | HCl | MeOH in reaction | MeOH in wash | Percent yield [2] |
|---|---|---|---|---|
| (USING 38% HCl) | | | | |
| 1.0 | 1.5 | 1.0 | 1.0 | 77 |
| (USING 33% HCl) | | | | |
| 1.0 | 1.5 | 1.0 | 1.0 | 69 |
| (USING 28% HCl) | | | | |
| 1.0 | 1.5 | 1.0 | 1.0 | 60 |

[1] Hydroxylammonium sulfate.
[2] Hydroxylammonium chloride.

From the foregoing description, it will be apparent to those skilled in the art that numerous equivalents and modifications of the process described herein, exist. For example, instead of utilizing hydroxylammonium sulfate, the acid sulfate may be employed. In such instances, it is preferable to employ at least two moles of hydrochloric acid for each mole of hydroxylammonium acid sulfate present. Other equivalents and modifications of my process will be readily recognized by those skilled in the art.

My invention now having been described, what I claim is:

1. In a process for the production of hydroxylammonium chloride, the step which comprises reacting aqueous hydrochloric acid with hydroxylammonium sulfate.

2. In a process for the production of hydroxylammonium chloride, the step which comprises reacting aqueous hydrochloric acid with hydroxylammonium sulfate in the presence of a suitable solvent.

3. In a process for the production of hydroxylammonium chloride, the step which comprises reacting aqueous hydrochloric acid with hydroxylammonium sulfate in the presence of a lower aliphatic alcohol.

4. In a process for the production of hydroxylammonium chloride, the steps which comprise reacting hydroxylammonium sulfate with aqueous hydrochloric acid, and cooling the resulting reaction mixture to a temperature at which said hydroxylammonium chloride precipitates.

5. In a process for the production of hydroxylammonium chloride, the steps which comprise reacting aqueous hydrochloric acid with hydroxylammonium sulfate in the presence of a lower aliphatic alcohol, and cooling the resulting reaction mixture to a temperature at which said hydroxylammonium chloride precipitates.

6. In a process for the production of hydroxylammonium chloride, the steps which comprise reacting aqueous hydrochloric acid with hydroxylammonium sulfate in the presence of methanol, and cooling the resulting reaction mixture to a temperature at which said hydroxylammonium chloride precipitates.

7. In a process for the production of hydroxylammonium chloride, the step which comprises reacting aqueous hydrochloric acid with hydroxylammonium sulfate in the presence of a lower aliphatic alcohol, and at a temperature between 0° and 85° C.

8. In a process for the production of hydroxylammonium chloride, the step which comprises reacting aqueous hydrochloric acid with hydroxylammonium sulfate in the presence of a suitable solvent, and at a temperature between 20° and 70° C.

9. In a process for the production of hydroxylammonium chloride, the steps which comprise agitating a mixture of aqueous hydrochloric acid and hydroxylammonium sulfate, cooling the resulting reaction mixture to a temperature at which hydroxylammonium chloride precipitates, and separating said hydroxylammonium chloride from the reaction mixture.

10. In a process for the production of hydroxylammonium chloride, the steps which comprise heating a mixture consisting of aqueous hydrochloride acid, hydroxylammonium sulfate, and a lower aliphatic alcohol, cooling the resulting reaction mixture to a temperature at which hydroxylammonium chloride precipitates, and separating said hydroxylammonium chloride from the reaction mixture.

PHILIP F. TRYON.